(12) United States Patent
Kung et al.

(10) Patent No.: US 8,304,370 B2
(45) Date of Patent: Nov. 6, 2012

(54) IMAGE RECEIVER ELEMENTS

(75) Inventors: Teh-Ming Kung, Rochester, NY (US); Catherine A. Falkner, Rochester, NY (US); Yongcai Wang, Webster, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 456 days.

(21) Appl. No.: 12/621,829

(22) Filed: Nov. 19, 2009

(65) Prior Publication Data

US 2011/0117299 A1 May 19, 2011

(51) Int. Cl.
*B41M 5/035* (2006.01)
*B41M 5/50* (2006.01)

(52) U.S. Cl. .......................... 503/227; 8/471

(58) Field of Classification Search .................. None
See application file for complete search history.

(56) References Cited

U.S. PATENT DOCUMENTS

| | | | |
|---|---|---|---|
| 4,740,497 A | 4/1988 | Harrison et al. |
| 4,927,803 A | 5/1990 | Bailey et al. |
| 4,962,080 A | 10/1990 | Watanabe |
| 5,317,001 A | 5/1994 | Daly et al. |
| 5,356,859 A | 10/1994 | Lum et al. |
| 5,411,931 A | 5/1995 | Kung |
| 5,529,972 A | 6/1996 | Ramello et al. |
| 6,096,685 A | 8/2000 | Pope et al. |
| 6,268,101 B1 | 7/2001 | Yacobucci et al. |
| 6,291,396 B1 | 9/2001 | Bodem et al. |
| 7,189,676 B2 | 3/2007 | Bourdelais et al. |

OTHER PUBLICATIONS

U.S. Appl. No. 12/533,081, filed Jul. 31, 2009, titled Image Receiver Elements With Aqueous Dye Receiving Layer, by Debasis Majumdar et al.

*Primary Examiner* — Bruce H Hess
(74) *Attorney, Agent, or Firm* — J. Lanny Tucker

(57) ABSTRACT

An image receiver element includes a water-soluble or water-dispersible polyurethane binder in the image receiving layer. This polyurethane has a $T_g$ of from about 60 to about 80° C., a molecular weight of at least 25,000, and an acid number of from about 16 to about 35 mg KOH/g. Moreover, the polyurethane comprises from about 42 to about 60 weight % of recurring urethane units, from about 8 to about 20 weight % of alkylene glycol recurring units, from about 18 to about 40 weight % of carbonate recurring units having aliphatic side chains, and from about 3 to about 15 weight % of recurring units having a water-soluble or water-dispersible acid group, based on total binder weight.

20 Claims, No Drawings

IMAGE RECEIVER ELEMENTS

FIELD OF THE INVENTION

This present invention relates to image receiver elements that have at least one aqueous-coated image receiving layer containing a specific water-dispersible polyurethane (latex) binder. Such image receiving elements can be used as thermal dye transfer receiver elements that can be used in a thermal assembly in combination with a dye image donor element.

BACKGROUND OF THE INVENTION

In recent years, thermal transfer systems have been developed to obtain prints from pictures that have been generated from a camera or scanning device. According to one way of obtaining such prints, an electronic picture is first subjected to color separation by color filters. The respective color-separated images are then converted into electrical signals. These signals are then transmitted to a thermal printer. To obtain the print, a cyan, magenta or yellow dye-donor element is placed face-to-face with a dye receiver element in an image assembly. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other colors. A color hard copy is thus obtained which corresponds to the original picture viewed on a screen.

Dye receiver elements used in thermal dye transfer generally include a support (transparent or reflective) bearing on one side thereof a dye image-receiving layer, and optionally additional layers, such as a compliant or cushioning layer between the support and the dye receiving layer.

Various approaches have been suggested for providing a thermal dye receiving layer. Solvent-coating of the dye receptive polymers is a commonly used approach. Such methods involve expensive, polluting, and hazardous manufacturing processes. To reduce risks of fire, explosions, and other accidents, special precautions and expensive manufacturing apparatus are needed for handling the organic solvent solutions used in that type of manufacture. Another approach involves hot-melt extrusion of the dye receiving polymers onto a support. Such methods restrict the type of materials that can be incorporated into the layer due to the high temperatures required for the extrusion process. Still another approach utilizes aqueous coating of water-soluble or water-dispersible polymers to provide the dye receiving layer.

Although such aqueous coating methods reduce or eliminate the use of hazardous solvents, and high temperature coating processes, such aqueous-coated layers cause problems in typical customer printing environments where high speed printing requires a smooth separation of donor ribbon element and receiver element with no sticking between the two surfaces. Printing in high humidity environments can be particularly troublesome for sticking with typical aqueous-coated receivers. Moreover, such receiver elements are often deficient in providing adequate dye density. Furthermore, imaged prints bearing the aqueous coated layer are not robust in situations where the print is contacted with water and separation of the layer can occur.

Various polymers have been used to prepare dye image-transfer receiver layers including water-dispersible polyesters (see U.S. Pat. No. 5,317,001 of Daly et al.), polycarbonates and polyesters such as those described in U.S. Pat. Nos. 4,740,497 (Harrison et al.) and 4,927,803 (Bailey et al.). Aqueous dispersible polyesters are described in U.S. Pat. No. 5,317,001 (Daly et al.).

Polyurethanes are described for use as polymeric binders in receiving elements in U.S. Pat. Nos. 5,411,931 (Kung), 6,096,685 (Pope et al.), and 6,291,396 (Bodem et al.).

Thus, a common problem with the use of some thermal dye donor elements and corresponding thermal dye receiver elements is that at high dye transfer temperatures, the polymers in the elements can soften and cause adherence between the elements, resulting in sticking and tearing of the elements during separation. Areas within the donor element (other than the transferred dyes) can adhere to the receiver element, rendering the receiving element useless.

This problem has been addressed in many ways including the incorporation of release agents such as silicone waxes and oils as lubricating materials in either or both elements. For example, U.S. Pat. No. 5,356,859 (Lum et al. describes the use of dimethyl siloxane in thermal dye image receiver elements and U.S. Pat. No. 4,962,080 (Watanabe) describes the use of alcohol-modified silicone oils in a similar manner.

U.S. Pat. No. 7,189,676 (Bourdelais et al.) describes an image receiver sheet comprising a crosslinked co-polymer of polyester and a lubricating polymer comprising a polyurethane wherein the crosslinked copolymer is formed from a water dispersion. Such copolymers are difficult to synthesize and are rarely commercially available. U.S. Pat. No. 5,529,972 (Ramello et al.) describes an image receiver sheet with a dye receiving layer comprising dried polymeric latex wherein the latex may be selected from a group including polyurethane latexes. The technology as described in this patent does not provide adequate maximum densities. In addition, a separate layer of siloxane material is coated above the receiver layer to provide protective and release properties. This requires an additional manufacturing operation. U.S. Pat. No. 4,962,080 (Watanabe) describes an image receiver sheet with an aqueous dye receiving layer, wherein the receiver layer also comprises silicone oil. This patent shows that very low densities are obtained with this technology due to the thick receiving layers employed.

While such polymeric binders are useful in the thermal dye-transfer receiving elements, we have discovered a need for image receiver elements having aqueous-coated image receiving layers that have improved resistance to variable sensitometry in high humidity environments.

SUMMARY OF THE INVENTION

This invention provides an image receiver element comprising a water-soluble or water-dispersible polyurethane binder, for example, in an image receiving layer, and having a $T_g$ of from about 60 to about 80° C., a molecular weight of at least 25,000, and an acid number of from about 16 to about 35 mg KOH/g, the polyurethane comprising from about 25 to about 60 weight % of recurring urethane units, from about 8 to about 20 weight % of alkylene glycol recurring units, from about 18 to about 40 weight % of carbonate recurring units having aliphatic side chains, and from about 3 to about 15 weight % of recurring units having a water-soluble or water-dispersible acid group, based on total binder weight.

Many embodiments of this invention are thermal dye transfer receiver elements that can be used to provide color images in thermal transfer from a thermal dye donor element.

Thus, this invention also provides an imaging assembly comprising the image receiver element of this invention in thermal association with an image donor, for example as an assembly of a thermal dye transfer receiver element and a thermal dye donor element.

The elements of the present invention can be used to provide either a glossy or matte image or material, which image can be borderless or have a border.

The present invention includes a thermal dye transfer receiver element that can be image-wise printed with dyes that migrate from a thermal dye transfer donor by means of heating, the element comprising a support and at least one thermal dye transfer receiving layer coated on at least one side of said support. The thermal dye transfer receiving layer comprises a dye-accepting polyurethane having specific properties and composition as described in more detail below.

Polyurethane compounds have been known since the discovery in 1937 of diisocyanate addition polymerization. The term "polyurethane compound" does not mean a polymer that contains only urethane groups or recurring units, but means all those polymers which contain a significant number of urethane recurring units, regardless of what the rest of the molecule may be. Homopolymers of isocyanates are usually referred to as isocyanate polymers. Usually polyurethane compounds are obtained by the reaction of polyisocyanates with polyhydroxy compounds, such as polyether polyols, polyester polyols, castor oils, or glycols, but compounds containing free hydrogen groups such as amine and carboxyl groups may also be used. Thus, a typical polyurethane compound may contain, in addition to urethane recurring units, aliphatic and aromatic hydrocarbon residues or recurring units, ester groups, ether groups, amide groups, and urea groups.

The thermal, non-silver halide-containing image receiver elements of this invention exhibit several important advantages, not all of which may be found in every embodiment. The image receiving layer can be coated out of aqueous formulations thereby avoiding organic solvent coating. The elements of this invention can have a number of other advantages including high dye transfer efficiency that leads to a more saturated color density, much improved humidity sensitivity (or less sensitive to humidity), less image bleeding, and reduced front-to-back blocking (or adhesion) for image-receiving layer coatings with aqueous formulations.

DETAILED DESCRIPTION OF THE INVENTION

Definitions

Unless otherwise indicated, the terms "image receiver element", "thermal dye transfer receiver element", "thermal receiver element", and "receiver element" refer to embodiments of the present invention.

The image receiver element has one or more layers on a suitable substrate, at least one layer being an aqueous-coated image receiving layer (IRL). Other useful layers are described below.

In one embodiment of the invention, the image receiver element is a thermal dye transfer receiver element comprising a support and one or more layers disposed thereon. In other embodiments, the image receiver element can be used in other techniques governing the thermal transfer of an image onto the imaging element. Such techniques include thermal dye transfer, electrophotographic printing, thermal wax transfer, or inkjet printing. Such elements then comprise at least one, respectively, thermal dye receiving layer, electrophotographic image receiving layer, thermal wax receiving layer, and inkjet receiving layer. The image receiver elements may be desired for reflection viewing, that is having an opaque support, or desired for viewing by transmitted light, that is having a transparent support. The image receiver elements do not contain silver halide or silver halide emulsions as are common in photographic or photothermographic elements.

The terms as used herein, "top", "upper", and "face" mean the side or toward the side of the imaging member bearing the imaging layers, image, or receiving the image.

The terms "bottom", "lower side", and "back" mean the side or toward the side of the imaging member opposite from the side bearing the imaging layers, image, or receiving the image.

The term "non-voided" is used to refer to a layer being devoid of added solid or liquid matter or voids containing a gas.

The term "voided" will include materials comprising microvoided polymers and microporous materials known in the art. A foam or polymer foam formed by means of a blowing agent is not considered a voided polymer for purposes of the present invention.

"Image receiving layer" (IRL) includes a "dye receiving layer" (DRL).

Unless otherwise indicated, the articles "a", "an" and "the" refer to one or more of the components referred to.

Aqueous Image Receiving Layer

This layer generally includes a water-dispersible polymer (latex) having one or more specific polyurethanes. These polyurethanes have a Tg of from about 60 to about 80° C. as determined by the known procedure of Differential Scanning Colorimetry (DSC). In addition, the polyurethanes have a molecular weight of at least 25,000 and up to 150,000 as determined by the known procedure of Size Exclusion Chromatography. Further, the polyurethanes have an acid number of from about 16 to about 35 mg KOH/g of polymer or from about 16 to about 25 mg KOH/g of polymer. "Acid number" is also known as the "acid value".

In general, these polymer dispersions can be prepared from reaction of a polyol with a diisocyanate or polyisocyanate in the presence of suitable catalysts and additives. These reactions, conditions, and reactants are well known in the art and generally utilize various polymerization catalysts. Specific preparations of useful polyurethane latexes or dispersions are provided below with the Examples.

For example, the polyurethane binders useful in this invention comprise from about 42 to about 60, and typically from 50 to 60, weight % of recurring urethane units, from about 8 to about 20, and typically from 17 to 20, weight % of alkylene glycol recurring units, from about 18 to about 40, and typically from 18 to 25, weight % of carbonate recurring units having aliphatic side chains, and from about 3 to about 15, and typically from 3 to 9, weight % of recurring units having a water-soluble or water-dispersible acid group, based on total binder weight.

In some embodiments, the polyurethane binder comprises butanediol recurring units and carboxylic acid recurring units.

More specifically, the polyurethane binder is represented by the following Structure (PB):

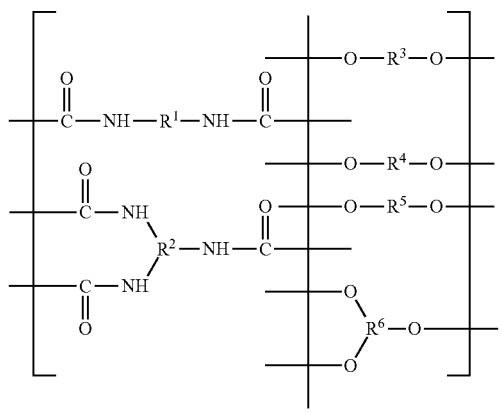

wherein $R^1$ and $R^2$ independently represent substituted or unsubstituted divalent aliphatic, cycloaliphatic, or aromatic groups in the recurring urethane units, $R^3$ represents a substituted or unsubstituted divalent alkylene group in the glycol recurring units, $R^4$ represents a divalent acid-substituted aliphatic group in the acid recurring units, and $R^5$ and $R^6$ independently represent the residues of polycarbonate diols.

For example, the divalent aliphatic, cycloaliphatic, and aromatic groups for $R^1$ and $R^2$ include substituted or unsubstituted organic groups having 1 to 20 carbon and other atoms in the divalent chain and include but are not limited to, the hydrocarbon groups having the following structures. Thus, the recurring units containing $R^1$ and $R^2$ can be derived from a variety of mono- and poly-isocyanates.

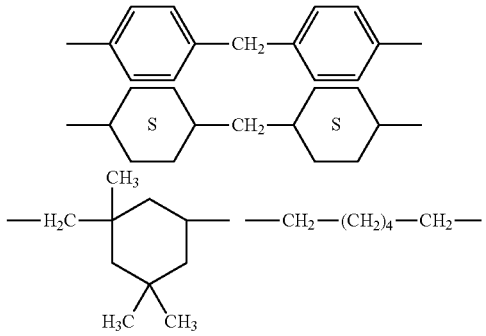

The substituted or unsubstituted divalent alkylene groups for $R^3$ typically have from 1 to 10 carbon atoms in the divalent chain but they can be linear or branched groups and include for example, methylene, ethylene, isopropylene, n-butylene, and hexylene. The recurring units containing $R^3$ can be derived from a variety of diols including 1,4-butanediol.

The divalent acid-substituted aliphatic groups for $R^4$ generally have 1 to 10 carbon and other atoms in the divalent chain having at least one carbon atom to which at least one an acid group is attached. Useful acid groups include but are not limited to carboxylic acid, sulfonic acid, and phosphonic acid groups. These recurring units can be derived from a variety of acid-substituted diols similar to those defined above for $R^3$.

The divalent aliphatic carbonate groups for $R^5$ and $R^6$ can have 1 to 20 carbon and other atoms in the divalent aliphatic (for example hydrocarbon) chain and can be derived from various polycarbonate diols that would be readily apparent to one skilled in the art, and generally have a molecular weight of from about 200 to about 3,000.

The water-dispersible polyurethane is generally present in the image receiving layer in an amount of from about 90 to 100, and typically from 95 to 99.9, weight %, based on total layer dry weight.

The aqueous-coated image receiving layer can include other optional components including but not limited to antistatic agents (described below), various non-polyurethane copolymers (such as polyesters, polycarbonates, poly(cyclohexylenedimethylene terephthalate), and vinyl modified polyester copolymers) as described for example in U.S. Pat. No. 7,189,676 (noted above), plasticizers such as monomeric or polymeric esters as described for example in Col. 4 of U.S. Pat. No. 7,514,028 (Kung et al.), stabilizers, release agents, or coating agents.

Useful antistatic agents include both organic and inorganic compounds that are electrically-conductive that can be either ionic conductors or electronic conductors. They can include simple inorganic salts, alkali metal salts or surfactants, ionic conductive polymers, polymeric electrolytes containing alkali metal salts, colloidal metal oxide sols, and other useful compounds known in the art. These compounds can be incorporated into the aqueous-coated image receiving layer in appropriate amounts for a desired conductivity.

In many embodiments, the aqueous-coated image receiving layer is the outermost layer of the image receiver element, but in some embodiments, the element further comprises an outermost layer disposed on the image receiving layer. This outermost layer can comprise one or more film-forming polymers such as polyesters, polyurethanes, and polyureas and generally has a dry thickness of from about 0.1 to about 2 μm, or typically from about 0.2 to about 1 μm.

The image receiving element generally has one or more additional layers between the support and the image receiving layer, and at least one of those additional layers can comprise an antistatic agent (such as one of those described above).

The support for the receiver element can be a transparent film, for example, a poly(ether sulfone), a polyimide, a cellulose ester such as cellulose acetate, a poly(vinyl alcohol-co-acetal), or a poly(ethylene terephthalate). The support can be a reflective layer, for example, baryta-coated paper, white polyester (polyester with white pigment incorporated therein), an ivory paper, a condenser paper, a cellulosic raw paper base, or a synthetic paper base, for example, DuPont Tyvek® by E.I. DuPont de Nemours and Company. The support can be employed at any desired thickness, for example, from about 10 μm to about 1000 μm. Exemplary supports for the dye image-receiving layer are disclosed in U.S. Pat. Nos. 5,244,861 (Campbell et al.) and 5,928,990 (Guistina et al.), and in EP 671,281 (Campbell et al.). Other suitable supports as known to practitioners in the art can also be used, and can be chosen dependent on the image transfer system being used.

According to various embodiments, the element can be a composite or laminate structure comprising a support base layer and one or more additional layers between this support base layer and image receiving layer. The additional layers can include an antistatic tie-layer or subbing layer, an adhesive layer, a backing layer, one or more slip layers, or a combination of various layers. The support base layer can comprise more than one material, for example, a combination of one or more of a compliant layer or a microvoided layer, a compliant layer with hollow particles, a layer with elastomeric resins, a nonvoided layer, a synthetic paper, a natural cellulosic raw paper, and a polymer film.

In some embodiments of this invention, the image receiving layer is a thermal dye transfer receiving layer that is the outermost layer and the image receiver element has a support that is composed of a cellulosic raw paper base or synthetic paper base.

In yet other embodiments, the thermal dye transfer receiver element includes a thermal dye transfer receiving layer, an antistatic tie layer, a compliant layer or microvoided film, and the support.

In still other embodiments, the compliant layer is an extruded layer and there is a skin layer immediately adjacent one or both sides of the compliant layer.

The resins used on the bottom or wire side (backside) of the support are thermoplastics such as polyolefins such as polyethylene, polypropylene, copolymers of these resins, and blends of these resins. Other useful polymers include poly(styrene-butadiene), poly(styrene-acrylates), poly(vinyl-butyral) and poly(vinyl chloride-co-vinyl acetate). The thickness of the resin layer on the bottom side of the raw base can range from about 5 µm to about 75 µm, and typically from about 10 µm to about 40 µm. The thickness and resin composition of the resin layer can be adjusted to provide desired curl characteristics. The surface roughness of this resin layer can be adjusted to provide desired conveyance properties in imaging printers.

In some embodiments, the image receiver elements are "dual-sided", meaning that they have an image receiving layer (such as a thermal dye receiving layer) on both sides of the support.

Dye Donors Elements

Ink or thermal dye-donor elements that may be used with the image receiver element generally comprise a support having thereon an ink or dye containing layer.

Any ink or dye may be used in the thermal ink or dye-donor provided that it is transferable to the thermal ink or dye-receiving or recording layer by the action of heat. Ink or dye donor elements useful with the present invention are described, for example, in U.S. Pat. Nos. 4,916,112 (Henzel et al.), 4,927,803 (Bailey et al.), and 5,023,228 (Henzel), and U.S. Patent Application Publication 2006/0135363 (Landry-Coltrain et al.) that are all incorporated herein by reference. As noted above, ink or dye-donor elements may be used to form an ink or dye transfer image. Such a process comprises image-wise-heating an ink or dye-donor element and transferring an ink or dye image to an ink or thermal dye-receiving or recording element as described above to form the ink or dye transfer image. The thermal ink or dye transfer method of printing, an ink or dye donor element may be employed that comprises a poly(ethylene terephthalate) support coated with sequential repeating areas of cyan, magenta, or yellow ink or dye, and the ink or dye transfer steps may be sequentially performed for each color to obtain a multi-color ink or dye transfer image. The support may also include a clear protective layer that can be transferred onto the transferred dye images. When the process is performed using only a single color, then a monochrome ink or dye transfer image may be obtained.

Dye-donor elements that may be used with the image receiver element of this invention conventionally comprise a support having thereon a dye containing layer. Any dye can be used in the dye layer of the dye-donor element of the invention provided it is transferable to the dye-receiving layer by the action of heat. Especially good results have been obtained with diffusible dyes, such as the magenta dyes described in U.S. Pat. No. 7,160,664 (Goswami et al.) that is incorporated herein by reference.

The dye-donor layer can include a single color area (or patch) or multiple colored areas (patches) containing dyes suitable for thermal printing. As used herein, a "dye" can be one or more dye, pigment, colorant, or a combination thereof, and can optionally be in a binder or carrier as known to practitioners in the art. For example, the dye layer can include a magenta dye combination and further comprise a yellow dye-donor patch comprising at least one bis-pyrazolone-methine dye and at least one other pyrazolone methine dye, and a cyan dye-donor patch comprising at least one indoaniline cyan dye.

Any dye transferable by heat can be used in the dye-donor layer of the dye-donor element. The dye can be selected by taking into consideration hue, lightfastness, and solubility of the dye in the dye donor layer binder and the image receiving layer binder (polyurethane described herein).

Further examples of useful dyes can be found in U.S. Pat. Nos. 4,541,830 (Hotta et al.), 4,698,651 (Moore et al.), 4,695,287 (Evans et al.), 4,701,439 (Weaver et al.), 4,757,046 (Byers et al.), 4,743,582 (Evans et al.), 4,769,360 (Evans et al.), 4,753,922 (Byers et al.), 4,910,187 (Sato et al.), 5,026,677 (Vanmaele), 5,101,035 (Bach et al.), 5,142,089 (Vanmaele), 5,374,601 (Takiguchi et al.), 5,476,943 (Komamura et al.), 5,532,202 (Yoshida), 5,804,531 (Evans et al.), 6,265,345 (Yoshida et al.), 7,501,382 (Foster et al.), and U.S. Patent Application Publications 2003/0181331 (Ieshige et al.) and 2008/0254383 (Soejima et al.), the disclosures of which are hereby incorporated by reference.

The dyes can be employed singly or in combination to obtain a monochrome dye-donor layer or a black dye-donor layer. The dyes can be used in an amount of from about 0.05 g/m² to about 1 g/m² of coverage. According to various embodiments, the dyes can be hydrophobic.

Imaging and Assemblies

As noted above, dye donor elements and image receiver elements can be used to form a dye transfer image. Such a process can comprise imagewise-heating a thermal dye donor element and transferring a dye image to a thermal dye transfer receiver element of this invention as described above to form the dye transfer image.

In one embodiment of the invention, a thermal dye donor element may be employed which comprises a poly(ethylene terephthalate) support coated with sequential repeating areas of cyan, magenta and yellow dye, and the dye transfer steps are sequentially performed for each color to obtain a three-color dye transfer image. The dye donor element may also contain a colorless area that may be transferred to the image receiving element to provide a protective overcoat.

Thermal printing heads which may be used to transfer ink or dye from ink or dye-donor elements to an image receiver element may be available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB Publication 2,083,726A that is incorporated herein by reference.

In another embodiment, the image receiver element may be an electrophotographic imaging element wherein the antistatic properties are optimized for the needs of the electrophotographic process. The electrographic and electrophotographic processes and their individual steps have been well described in the prior art, for example in U.S. Pat. No. 2,297, 691 (Carlson). The processes incorporate the basic steps of creating an electrostatic image, developing that image with charged, colored particles (toner), optionally transferring the resulting developed image to a secondary substrate, and fixing the image to the substrate. There are numerous variations in these processes and basic steps such as the use of liquid toners in place of dry toners is simply one of those variations.

The first basic step, creation of an electrostatic image, may be accomplished by a variety of methods. The electrophotographic process of copiers uses imagewise photodischarge, through analog or digital exposure, of a uniformly charged photoconductor. The photoconductor may be a single use system, or it may be rechargeable and re-imageable, like those based on selenium or organic photoreceptors.

In an alternate electrographic process, electrostatic images are created ionographically. The latent image is created on dielectric (charge holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a re-imageable photoreceptor or an electrographic master is used, the toned image is transferred to an electrophotographic image receiving element. The receiving element is charged electrostatically with the polarity chosen to cause the toner particles to transfer to the receiving element. Finally, the toned image is fixed to the image receiver element. For self-fixing toners, residual liquid is removed from the image receiver element by air drying or heating. Upon evaporation of the solvent, these toners form a film bonded to the image receiver element. For heat-fusible toners, thermoplastic polymers are used as part of the particle. Heating both removes residual liquid and fixes the toner to image receiver element.

In another embodiment of this invention, the image receiver element can be used to receive a wax-based ink from an ink jet printer using what is known as a "phase change ink" that is transferred as described for example in U.S. Pat. Nos. 7,381,254 (Wu et al.), 7,541,406 (Banning et al.), and 7,501,015 (Odell et al.) that are incorporated herein by reference.

A thermal transfer assemblage may comprise (a) an ink or dye-donor element, and (b) a thermal dye transfer receiver element of this invention, the ink or dye image receiver element being in a superposed relationship with the ink or dye donor element so that the ink or dye layer of the donor element may be in contact with the thermal dye transfer receiving layer. Imaging can be obtained with this assembly using known processes.

When a three-color image is to be obtained, the above assemblage may be formed on three occasions during the time when heat may be applied by the thermal printing head. After the first dye is transferred, the elements may be peeled apart. A second dye donor element (or another area of the donor element with a different dye area) may be then brought in register with the thermal dye transfer receiving layer and the process repeated. The third color may be obtained in the same manner.

The present invention provides at least the following embodiments and combinations thereof:

1. An image receiver element comprising a water-soluble or water-dispersible polyurethane binder having a $T_g$ of from about 60 to about 80° C., a molecular weight of at least 25,000, and an acid number of from about 16 to about 35 mg KOH/g, the polyurethane comprising from about 42 to about 60 weight % of recurring urethane units, from about 8 to about 20 weight % of alkylene glycol recurring units, from about 18 to about 40 weight % of carbonate recurring units having aliphatic side chains, and from about 3 to about 15 weight % of recurring units having a water-soluble or water-dispersible acid group, based on total binder weight.

2. The element of embodiment 1 wherein the polyurethane binder comprises from 50 to 60 weight % of recurring urethane units, from 17 to 20 weight % of alkylene glycol recurring units, from 18 to 25 weight % of carbonate recurring units having aliphatic side chains, and from 3 to 9 weight % of recurring units having a water-soluble or water-dispersible acid group, based on total binder weight.

3. The element of embodiment 1 or 2 wherein the polyurethane binder comprises ethylene glycol recurring units and carboxy acid-containing recurring units.

4. The element of any of embodiments 1 to 3 wherein the polyurethane binder is represented by the following Structure (PB):

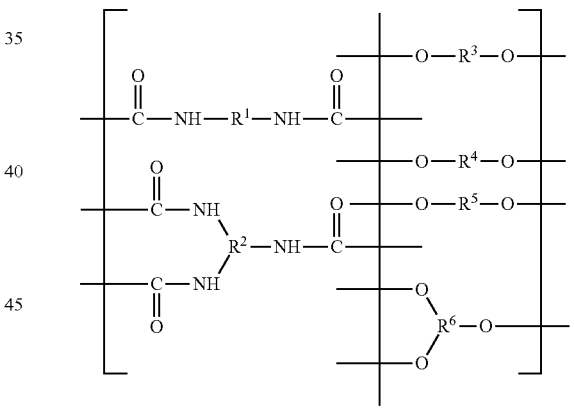

wherein $R^1$ and $R^2$ independently represent substituted or unsubstituted divalent aliphatic, cycloaliphatic, or aromatic groups in the recurring urethane units, $R^3$ represents a substituted or unsubstituted divalent alkylene group in the glycol recurring units, $R^4$ represents a divalent acid-substituted aliphatic group in the acid recurring units, and $R^5$ and $R^6$ independently represent divalent aliphatic carbonate groups in the carbonate recurring units.

5. The element of any of embodiments 1 to 4 comprising an image receiving layer comprising the polyurethane in an amount of from about 90 to 100 weight % of the total image receiving layer dry weight.

6. The element of any of embodiments 1 to 5 wherein the polyurethane binder is present in an image receiving layer that is the outermost layer disposed on a support.

7. The element of any of embodiment 6 further comprising one or more additional layers between the support and the image receiving layer, at least one of the additional layers comprising an antistatic agent.

8. The element of any of embodiments 1 to 7 wherein the image receiving layer further comprises an antistatic agent.

9. The element of any of embodiments 1 to 8 that is a thermal dye transfer receiver element.

10. The element of any of embodiments 1 to 9 wherein the image receiving layer is a thermal dye transfer receiving layer that is the outermost layer and the element has a support that is composed of a cellulosic raw paper base or synthetic paper base.

11. The element of embodiment 10 comprising, in order, the thermal dye transfer receiving layer, an antistatic tie layer, a compliant layer or microvoided film, and the support.

12. The element of embodiment 11 wherein the compliant layer is an extruded layer and the element further comprises a skin layer immediately adjacent one or both sides of the compliant layer.

13. The element of embodiment 11 or 12 wherein the compliant layer comprises hollow particles.

14. An imaging assembly comprising the image receiver element of any of embodiments 1 to 13 in thermal association with a thermal dye donor element.

The following Examples are provided to illustrate the practice of the present invention, but the invention is not to be limited by the Examples in any manner.

EXAMPLES

The polyurethane latexes used in the practice of this invention were prepared as dispersions using the following procedure:

In a 1-liter, three-necked round bottom flask equipped with a stirrer, water condenser, and nitrogen inlet were placed 35.4 g (0.0177 moles) of polycarbonate polyol (average Mn=2000) (Aldrich Chemical), 4.56 g (0.034 moles) of 2,2-bis(hydroxymethyl)propionic acid (DMPA), 17.87 g (0.1983 mole) of 1,4-butanediol, 52 g of tetrahydrofuran (THF), and 0.50 ml of dibutyltin dilaurate (catalyst). The reaction temperature was adjusted to 65° C. When a homogenous solution was obtained, 55.57 g (0.25 moles) of isophorone diisocyanate (IPDI) was slowly added followed by 10 g of THF. The reaction temperature was raised to 75° C. and maintained for 24 hours to complete the reaction, resulting in an intermediate containing no residual free isocyanate. The free isocyanate content was monitored by the disappearance of the NCO absorption peak by infrared spectroscopy.

The reaction mixture was diluted with THF and neutralized with triethylamine (TEA) to 100% stoichiometric neutralization of the carboxylic acid, followed by the addition of 340 g of distilled water under high shear to form a stable aqueous dispersion. THF was removed by heating under vacuum. The resultant aqueous dispersion was then filtered. The resulting polyurethane had a weight average molecular weight of about 31,700 and an acid number of about 17 mg KOH/g. This polyurethane dispersion was designated as PUR-E1.

All of the other tested polyurethane dispersions shown below in TABLE I were prepared in a similar manner. The chemical compositions and some characteristic physical properties of the aqueous dispersions of polyurethanes are listed in TABLE I below. "PUR" refers to the polyurethane dispersion and those identified with "C1" through "C3" were used in the Comparative Examples while those identified as "E1" through "E5" were used in the Invention Examples. "Wt. %" represents the weight % of the recurring units in the resulting polyurethane. The Tg was determined by DSC.

TABLE I

| PUR Dispersions | Weight % Polycarbonate Diol Recurring Units | Weight % 1,4-butanediol Recurring Units | Weight % Isophrone Diisocyanate Recurring Units | Weight % Bis(hydroxymethyl)-propionic Acid Recurring Units | Neutralizing Base | Tg (° C.) | Molecular Weight |
|---|---|---|---|---|---|---|---|
| PUR-C1 | 42 | 12 | 42 | 4 | None | 56 | 36,000 |
| PUR-C2 | 42 | 12 | 42 | 4 | KOH | 74 | 31,100 |
| PUR-C3 | 41 | 10 | 41 | 8 | TEA | 64 | 28200 |
| PUR-E1 | 31 | 16 | 49 | 4 | TEA | 74 | 31,700 |
| PUR-E2 | 24 | 18 | 54 | 4 | TEA | 72 | 27,000 |
| PUR-E3 | 19 | 19.8 | 58 | 4 | TEA | 78 | 40900 |
| PUR-E4 | 38 | 9 | 45 | 8 | TEA | 61 | 34,300 |
| PUR-E5 | 39 | 9 | 44 | 8 | TEA | 78 | 149,000 |

The thermal dye transfer receiving layers of the Invention Examples E1-E5 and Comparative Examples C1-C3 were coated from aqueous formulations in the following thermal receiver structure:

Thermal dye transfer receiving layer
Microvoided composite film OPPalyte® 350 K18 (ExxonMobil)
Pigmented polyethylene skin layer
Cellulose paper support
Polyethylene film
Polypropylene film The surface of the microvoided composite film OPPalyte® 350 K18 (ExxonMobil) was corona-discharge treated before the aqueous formulations of the thermal dye transfer receiving layer were coated thereon.

The aqueous formulations for thermal dye transfer receiving layers described in TABLE II below were composed of at least an aqueous PUR dispersion shown in Table 2 (except Comparative Example C1 of which tetrahydrofuran or THF is used as solvent for PUR-C1) and a small amount of Silwet® L-7230 from Crompton OSi Specialities (USA) as a coating aid and release agent. The prepared dispersions were hopper-coated at 7.6 meters per minute with sufficient surface air drying.

TABLE II

| Image Receiver Elements | PUR Dispersions | % Solids in PUR dispersions | Composition and dry coverage of thermal dye transfer receiving layer |
|---|---|---|---|
| C1 | PUR-C1 | 45.3 | 0.011 g/m² Silwet ® L-7230 and 3.3 g/m² PUR-C1 |
| C2 | PUR-C2 | 22.8 | 0.011 g/m² Silwet ® L-7230 and 3.3 g/m² PUR-C2 |
| C3 | PUR-C3 | 27.0 | 0.011 g/m² Silwet ® L-7230 and 3.3 g/m² PUR-C3 |
| E1 | PUR-E1 | 19.2 | 0.011 g/m² Silwet ® L-7230 and 3.3 g/m² PUR-E1 |

TABLE II-continued

| Image Receiver Elements | PUR Dispersions | % Solids in PUR dispersions | Composition and dry coverage of thermal dye transfer receiving layer |
|---|---|---|---|
| E2 | PUR-E2 | 18.0 | 0.011 g/m² Silwet ® L-7230 and 3.3 g/m² PUR-E2 |
| E3 | PUR-E3 | 17.7 | 0.011 g/m² Silwet ® L-7230 and 3.3 g/m² PUR-E3 |
| E4 | PUR-E4 | 25.4 | 0.011 g/m² Silwet ® L-7230 and 3.3 g/m² PUR-E4 |
| E5 | PUR-E5 | 18.9 | 0.011 g/m² Silwet ® L-7230 and 3.3 g/m² PUR-E5 |

The thermal dye transfer receiver elements described in TABLE II were printed in a Kodak® Photo Printer 6850 using a Kodak® thermal dye donor described in Examples I-1, I-9, and I-14 of U.S. Patent Application Publication 2006/0135363 (noted above), patch coated with cyan, magenta, and yellow dyes in ethyl cellulose binder. Ethocell 200 (Dow Corning) ethyl cellulose was used in place of the types of ethyl cellulose described in the noted publication. A poly (vinyl acetal)-based protective overcoat patch was also applied. Prints of the imaged receiver elements were then subjected to the following measurements and evaluations, such as, donor-receiver sticking performance, optical density (or OD) of the imaged prints, humidity sensitivity measurements, and bleeding tests. Also, the non-printed receivers of the Invention and Comparative Examples (in TABLE II) were used in a front-to-back receiver blocking test.

Donor-receiver sticking test was assessed using an image of multiple arrays of square blocks of various combinations of primary and secondary color density of CMY and process black. Donor-receiver sticking was noted where any portion of the donor element or image receiver element was observed to have drop-outs, spots, dye-donor layer transfer, or other indications of sticking as described herein.

Humidity sensitivity of the thermal dye transfer receiver elements was assessed by first conditioning the thermal media (donor and receiver elements) and the thermal printer under the following three environmental conditions, that is, 20%, 50%, and 86% Relative Humidity (RH) at 22.2° C., respectively, for 16 hours before any printing evaluation. The conditioned thermal media were then printed at the above described three environmental conditions using a 15-stepped block image of process black. The typical prints usually have optical density (OD) ranging from low (OD<0.2) to high (OD>2.0) as a result. The sensitometric curves (OD vs. energy steps) were obtained by measuring the optical density of the 15-stepped block image of process black using Gretag Macbeth SpectroScan 3.273 for the three environmental conditions. The degree of humidity sensitivity was assessed by comparing the area encompassed by the sensitometric differential curves between 86% RH and 50% RH and between 50% and 20% RH. A larger area encompassed by the two sensitometric differential curves represents a more humidity sensitive receiver element.

The bleeding test was performed by incubating the printed image receiver element with a spaced line pattern for two weeks at 50° C. and 50% RH and then the incubated samples were evaluated by qualitatively comparing the degree of lateral line-widening of the process black line against a pre-rated image target with varying degree of line-widening of the same line pattern noted above. The line-widening rating of the pre-rated image target is designated as follows:

0—no bleeding at all
1—very slight bleeding
2—minor bleeding
3—moderate bleeding
4—severe bleeding.

The blocking test was performed by placing the tested receiver elements (10.2×15.2 cm) inside an 1.5"×4"×6" (3.8× 10.2×15.2 cm) cavity of an aluminum block, and then placing them in an 1-Kg aluminum plate (10.2×15.2 cm) on top of the tested receiver elements for one week at 50° C. and 50% RH. The numeric rating for the degree of front-to back receiver blocking is designated as follows:

0—no blocking
1—blemish observed on dye receiving layer surface
2—light marks observed
3—moderate marks observed
4—heavy blocking In TABLE III below, all of the image receiver elements prepared using aqueous dispersions of polyurethanes (except C1) in the image receiving layer coatings achieved good to excellent dye transfer efficiency as illustrated by an $OD_{max}>2.0$ and no donor-receiver sticking observed. However, the practical attributes, such as humidity sensitivity, bleeding and blocking did not perform at the same desirable level to meet performance requirements for thermal printing applications. For instance, the use of dispersions PUR-C1, PUR-C2, and PUR-C3 showed excellent dye transfer efficiency with an $OD_{max}>2.5$, but their blocking performance was among the worst. The thermal dye transfer receiver element containing PUR-C2 was more humidity sensitive than the element containing PUR-C1 (44% higher), and the thermal dye transfer receiver element containing PUR-C2 also showed more bleeding concern. In contrast, the Invention thermal dye transfer receiver elements containing dispersions PUR-E1 through PUR-E5 exhibited not only good to excellent dye transfer efficiency, but more desirable humidity sensitivity ($\leq 1$) or less humidity sensitive as compared to the Comparative Example image receiver elements, none to very slight bleeding (0-1), and much improved (or less) blocking as compared to the Comparative Examples C1-C3.

TABLE III

| Receiver Elements | PUR Dispersions | Donor-receiver sticking | $OD_{max}$ (Red of Neutral) | Humidity sensitivity (Red of Neutral) | Bleeding | Blocking |
|---|---|---|---|---|---|---|
| C1 | PUR-C1 | none | 2.53 | 1* | 1 | 4 |
| C2 | PUR-C2 | none | 2.60 | 1.44 | 3 | 4 |
| C3 | PUR-C3 | none | 2.61 | 0.98 | 1 | 4 |
| E1 | PUR-E1 | none | 2.49 | 0.98 | 0 | 1 |
| E2 | PUR-E2 | none | 2.10 | 1.00 | 0 | 0 |
| E3 | PUR-E3 | none | 2.07 | 0.96 | 0 | 0 |

TABLE III-continued

| Receiver Elements | PUR Dispersions | Donor-receiver sticking | OD$_{max}$ (Red of Neutral) | Humidity sensitivity (Red of Neutral) | Bleeding | Blocking |
|---|---|---|---|---|---|---|
| E4 | PUR-E4 | none | 2.29 | 0.54 | 0 | 1 |
| E5 | PUR-E5 | none | 2.29 | 0.77 | 1 | 2 |

*The area encompassed by the sensitometric differential curves of the C1 receiver was selected as the common reference point for humidity sensitivity comparison. All the other numbers shown in the humidity sensitivity column were normalized against Area C1.

The invention has been described in detail with particular reference to certain preferred embodiments thereof, but it will be understood that variations and modifications can be effected within the spirit and scope of the invention.

The invention claimed is:

1. An image receiver element that is a thermal dye transfer receiver element, comprising a support and a thermal dye transfer receiving layer on at least one side of the support, the thermal dye transfer receiving layer comprising a dye-accepting water-soluble or water-dispersible polyurethane binder having a T$_g$ of from about 60 to about 80° C., a molecular weight of at least 25,000, and an acid number of from about 16 to about 35 mg KOH/g, the dye-accepting water-soluble or water-dispersible polyurethane binder comprising from about 42 to about 60 weight % of recurring urethane units, from about 8 to about 20 weight % of alkylene glycol recurring units, from about 18 to about 40 weight % of carbonate recurring units having aliphatic side chains, and from about 3 to about 15 weight % of recurring units having a water-soluble or water-dispersible acid group, based on total binder weight.

2. The element of claim 1 wherein the dye-accepting water-soluble or water-dispersible polyurethane binder comprises from 50 to 60 weight % of recurring urethane units, from 17 to 20 weight % of alkylene glycol recurring units, from 18 to 25 weight % of carbonate recurring units having aliphatic side chains, and from 3 to 9 weight % of recurring units having a water-soluble or water-dispersible acid group, based on total binder weight.

3. The element of claim 1 wherein the dye-accepting water-soluble or water-dispersible polyurethane binder comprises ethylene glycol recurring units and carboxy acid-containing recurring units.

4. The element of claim 1 wherein the dye-accepting water-soluble or water-dispersible polyurethane binder is represented by the following Structure (PB):

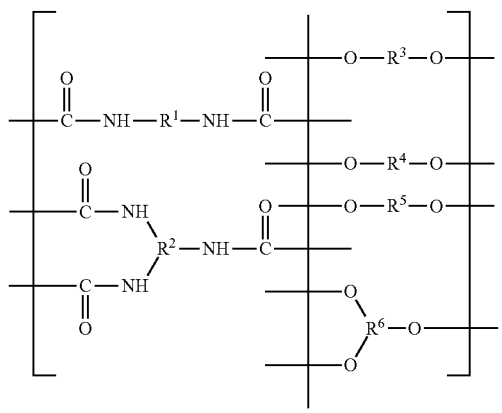

wherein R$^1$ and R$^2$ independently represent substituted or unsubstituted divalent aliphatic, cycloaliphatic, or aromatic groups in the recurring urethane units, R$^3$ represents a substituted or unsubstituted divalent alkylene group in the glycol recurring units, R$^4$ represents a divalent acid-substituted aliphatic group in the acid recurring units, and R$^5$ and R$^6$ independently represent divalent aliphatic carbonate groups in the carbonate recurring units.

5. The element of claim 1, wherein the thermal dye transfer receiving layer comprises the dye accepting water-soluble or water-dispersible polyurethane in an amount of from about 90 to 100 weight % of the total thermal dye transfer receiving layer dry weight.

6. The element of claim 1 wherein the thermal dye transfer receiving layer is the outermost layer disposed on the support.

7. The element of claim 6 further comprising one or more additional layers between the support and the thermal dye transfer receiving layer, at least one of the additional layers comprising an antistatic agent.

8. The element of claim 1 wherein the thermal dye transfer receiving layer further comprises an antistatic agent.

9. The element of claim 1 wherein the support comprises a cellulosic raw paper base or synthetic paper base.

10. The element of claim 1 comprising, in order, the thermal dye transfer receiving layer, an antistatic tie layer, a compliant layer or microvoided film, and the support.

11. The element of claim 10 wherein the compliant layer is an extruded layer and the element further comprises a skin layer immediately adjacent one or both sides of the compliant layer.

12. The element of claim 10 wherein the compliant layer comprises hollow particles.

13. An imaging assembly comprising the image receiver element of claim 1 in thermal association with a thermal dye donor element.

14. The imaging assembly of claim 13 wherein the dye-accepting water-soluble or water-dispersible polyurethane binder comprises from 50 to 60 weight % of recurring urethane units, from 17 to 20 weight % of alkylene glycol recurring units, from 18 to 25 weight % of carbonate recurring units having aliphatic side chains, and from 3 to 9 weight % of recurring units having a water-soluble or water-dispersible acid group, based on total binder weight.

15. The imaging assembly of claim 13 wherein the dye-accepting water-soluble or water-dispersible polyurethane binder is represented by the following Structure (PB):

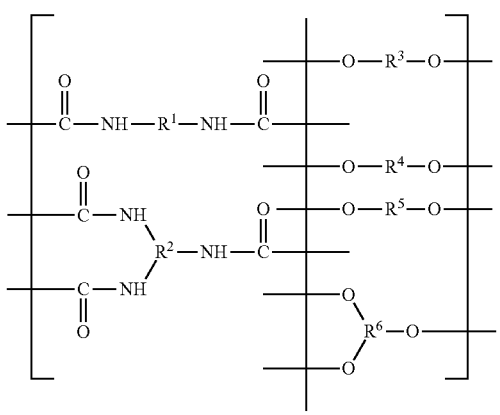

wherein $R^1$ and $R^2$ independently represent substituted or unsubstituted divalent aliphatic, cycloaliphatic, or aromatic groups in the recurring urethane units, $R^3$ represents a substituted or unsubstituted divalent alkylene group in the glycol recurring units, $R^4$ represents a divalent acid-substituted aliphatic group in the acid recurring units, and $R^5$ and $R^6$ independently represent divalent aliphatic carbonate groups in the carbonate recurring units.

16. The image receiver element of claim 1, comprising a thermal dye transfer receiving layer on both sides of the support.

17. A method for forming a dye transfer image, comprising:
bringing an image receiver element of claim 1 into thermal association with a dye donor element comprising a dye donor layer, and
imagewise heating the dye donor element to transfer a dye image to the thermal dye transfer receiving layer of the image receiver element.

18. The method of claim 17 comprising forming a three-color dye transfer image or protective overcoat in the thermal dye transfer receiving layer of the image receiver element.

19. The method of claim 17, wherein the image receiver element comprises a thermal dye transfer receiving layer on both sides of its support, and the method comprises forming a dye image in the thermal dye transfer receiving layer on both sides of the support.

20. A method for forming a dye image, comprising:
transferring a wax-based ink from an ink-jet printer to the thermal dye transfer receiving layer of the image receiver element of claim 1, to form a dye image in the thermal dye transfer receiving layer.

* * * * *